United States Patent [19]

Hampl, Jr. et al.

[11] Patent Number: 5,318,938
[45] Date of Patent: Jun. 7, 1994

[54] THERMOGRAPHIC ELEMENTS
[75] Inventors: Edward F. Hampl, Jr.; Susan K. Jongewaard, both of St. Paul; Suzanne J. Thompson, Stillwater, all of Minn.
[73] Assignee: Minnesota Mining and Manufacturing Company, St. Paul, Minn.
[21] Appl. No.: 603,800
[22] Filed: Oct. 26, 1990

Related U.S. Application Data

[63] Continuation-in-part of Ser. No. 512,047, Apr. 19, 1990, Pat. No. 5,115,372, which is a continuation-in-part of Ser. No. 348,262, May 4, 1989, Pat. No. 4,967,306.

[51] Int. Cl.⁵ .................... B41M 5/035; B41M 5/38; B41M 5/40
[52] U.S. Cl. .................... 503/200; 156/234; 428/195; 428/480; 428/488.4; 428/913; 503/227
[58] Field of Search .............. 8/471; 428/195, 480, 428/913, 914, 488.4; 503/200, 226, 227, 201; 156/234

[56] References Cited

U.S. PATENT DOCUMENTS

| | | | |
|---|---|---|---|
| 3,259,816 | 7/1963 | Katchman | 317/247 |
| 3,546,165 | 12/1970 | Morgan | 260/47 |
| 3,991,451 | 11/1976 | Maruyama et al. | 252/65 |
| 4,066,623 | 1/1978 | Besso et al. | 260/47 |
| 4,387,209 | 6/1983 | Rieder et al. | 528/176 |
| 4,401,803 | 8/1983 | Rieder | 528/176 |
| 4,430,493 | 2/1984 | Rieder | 528/179 |
| 4,436,782 | 3/1984 | Chungfah | 428/402 |
| 4,503,266 | 3/1985 | Szabolcs | 568/719 |
| 4,533,511 | 8/1985 | Mark | 264/184 |
| 4,572,860 | 2/1986 | Nakamura et al. | 428/216 |
| 4,592,945 | 6/1986 | Mecke et al. | 428/195 |
| 4,727,057 | 2/1988 | Harrison et al. | 503/227 |
| 4,756,064 | 7/1988 | Yoshii et al. | 361/323 |
| 4,768,130 | 8/1988 | Bernard et al. | 361/323 |
| 4,771,362 | 9/1988 | Behn | 361/323 |
| 4,808,565 | 2/1989 | Whitcomb et al. | 503/211 |
| 4,822,451 | 4/1989 | Ouderkirk et al. | 156/643 |
| 4,822,643 | 4/1989 | Chou et al. | 427/256 |
| 4,839,224 | 6/1989 | Chou et al. | 428/323 |
| 4,843,517 | 6/1989 | Maruyama et al. | 361/323 |
| 4,847,238 | 7/1989 | Jongewaard et al. | 503/227 |
| 4,853,365 | 8/1989 | Jongewaard et al. | 503/227 |
| 4,879,176 | 11/1989 | Ouderkirk et al. | 428/323 |
| 4,902,378 | 2/1990 | Ouderkirk et al. | 156/643 |
| 4,910,186 | 3/1990 | Whitcomb | 503/211 |
| 4,954,541 | 9/1990 | Nakane et al. | 524/86 |
| 4,967,306 | 10/1990 | Hampl et al. | 361/323 |
| 5,093,461 | 3/1992 | Herrscher | 528/219 |

FOREIGN PATENT DOCUMENTS

| | | | |
|---|---|---|---|
| 0137741 | 4/1985 | European Pat. Off. | 503/227 |
| 0289161 | 11/1988 | European Pat. Off. | 503/227 |
| 55-7467 | 1/1980 | Japan | 428/488.4 |
| 57-192432 | 11/1982 | Japan | 528/298 |
| 1246093A | of 1985 | Japan | 428/488.1 |
| 60-220794A2 | 11/1985 | Japan | 503/227 |
| 200785/87 | 6/1988 | Japan | 428/480 |
| 1-49638 | 10/1989 | Japan | 428/195 |
| PCT/AT87/-00062 | 10/1987 | PCT Int'l Appl. | 428/480 |
| 1122201 | 7/1968 | United Kingdom | 428/480 |

OTHER PUBLICATIONS

Morgan, P. W., "Aromatic Polyesters with Large Cross-Planar Substituents", Macromolecules, vol. 3, pp. 536–544, 1970.
Chemical Abstracts, vol. 70, No. 4, 1969, Abstr. No. 12086r.
Chemical Abstracts, vol. 62, No. 7, 1964, Abstr. No. 8419b.

Primary Examiner—B. Hamilton Hess
Attorney, Agent, or Firm—Gary L. Griswold; Walter N. Kirn; Eloise J. Maki

[57] ABSTRACT

Thermographic elements comprising at least two layers, wherein:
at least one of the layers comprises polymer, the polymer consisting essentially of, repeating, interpolymerized units derived from 9,9-bis-(4-hydroxyphenyl)-fluorene and isophthalic acid, terephthalic acid or blends thereof, the polymer being sufficiently low in oligomer content to allow formation of uniform film; and
at least one of the layers is an imaging layer, selected from the group consisting of dye-donor layers, image-receiving layers or heat-activatable imaging layers, and a method of thermal imaging using receptor films comprising the polymer described above.

27 Claims, 1 Drawing Sheet

THERMOGRAPHIC ELEMENTS

This application is a continuation-in-part application of U.S. application Ser. No. 512,047, filed Apr. 19, 1990 now U.S. Pat. No. 5,115,372, which is a continuation-in-part of U.S. application Ser. No. 348,262, filed May 4, 1989, now U.S. Pat. No. 4,967,306.

FIELD OF THE INVENTION

This invention relates to thermographic sheets for direct thermal imaging and thermal transfer imaging processes. In another aspect, this invention relates to the use of antistick coatings in thermographic sheets and a method of thermal transfer imaging.

BACKGROUND

In thermal imaging or printing, images are formed by heating heat-activatable materials in an imagewise manner. Such heating is commonly conducted by means of a thermal printhead, which consists of an array of electrically heatable elements, each of which is preferably activated by a computer in a time sequence designed to produce imagewise heating. The most common forms of thermal imaging are direct thermal imaging and thermal transfer imaging.

In thermal transfer imaging processes, an image is formed on a thermographic sheet known as a receptor sheet by selectively transferring an image forming material to the receptor sheet from another thermographic sheet, known as the donor sheet, using a thermal printhead. The three broad classes of thermal transfer imaging processes are described in U.S. Pat. No. 4,853,365 (Jongewaard et al). Typically, the donor sheet has a dye-donor layer disposed upon a thin, flexible substrate such as paper or polymeric film. Depending upon the type of thermal transfer imaging process desired, the dye-donor layer may take one of several forms, such as a meltable colored wax, a diffusing dye, or heat-activatable reactants which, when combined with other reactants incorporated into the receptor sheet, form a colored compound.

Generally, in direct thermal imaging processes a thermographic sheet having a dye-containing layer containing colorless forms of heat-activatable dyes and polymeric binder is heated in an imagewise manner by a thermal printhead. Upon application of heat, the colorless forms of the dyes are converted to their colored forms so that an image is formed in the dye-containing layer. Preferably, the thermal printhead directly contacts the dye-containing layer, however, many of the dye-containing layers contain compounds, such as the polymeric binder compounds, which soften or melt and stick to the printhead reducing printhead life and image quality.

Various materials have been described as being useful as substrates for thermographic sheets. For example, white-filled or transparent films of polyester (e.g., polyethylene terephthalate (PET)), polyethylene naphthalate, polysulphone, polystyrene, polycarbonate, polyimide, polyamide, cellulose ester (e.g., cellulose acetate and cellulose butyrate), polyvinyl chloride and paper have been described as useful. However, all of these materials have one or more disadvantages which reduce their suitability as substrates for thermographic sheets. For example, some of the materials have glass transition temperatures ($T_g$) or melting temperatures ($T_m$) which are lower than the temperature to which substrates would be heated during thermal imaging processes, resulting in image distortion. Some of the materials have poor optical properties (e.g., high coefficient of birefringence, high % haze or are inherently colored) rendering them unsuitable as substrates for certain thermal imaging applications, some have poor film properties (e.g., poor tensile strength and elongation at break), some have poor chemical resistance and some are hygroscopic.

Polyethylene terephthalate (PET) film has been preferred for use as substrates in thermographic sheets because it is a relatively low cost material, it is available in various thicknesses and it provides relatively good optical clarity and tensile strength. However, donor sheets made using PET film substrates have a tendency to soften or melt and stick on the thermal printhead, and friction between the PET film and the printhead can result in reduced printhead life and poor image quality. Generally, PET film of 4.5 to 6 micron thickness is used in donor sheets, but PET film of such thickness tends to dimensionally distort from the heat imparted by the printhead. Thus, donor sheets made using PET film cannot easily be reused or recycled, for example in thermal dye transfer processes. Since PET films of less than 4.5 micron thickness tend to wrinkle and tear during the thermographic element manufacturing process, e.g., on coating lines, very thin films (i.e., less than 4.5 microns) are not particularly practical for use in thermographic sheets.

One means of preventing sticking of the donor sheet to the printhead has been to select substrate materials which have softening temperatures higher than those encountered by the donor sheet in the printing process. For example, Japanese Patent application No. J6 1246-095-A, describes the use of copolymers containing acrylonitrile. However, none of the proposed materials have displaced PET film as the commercially preferred polymeric material for donor sheets.

In order to reduce sticking of thermographic sheets to the thermal printhead, antistick layers have been applied to the surface of the donor sheet contacting the thermal printhead and to the surface of the heat-activatable dye layer on thermographic sheets used in direct thermal imaging processes. For example, low surface energy compounds, such as fluoropolymers, silicones, waxes, fatty acids, and metal stearates, have been described as antistick coatings. Antistick compositions containing a low surface energy compound and a polymeric binder having a sufficiently high $T_g$ so the binder does not soften during the thermal imaging process have also been described.

One problem associated with the use of known antistick compounds or compositions is that many of the antistick compounds or compositions are not readily soluble or dispersible in commonly used organic solvents rendering such compounds or compositions difficult to use. Although some antistick compounds may be soluble in organic solvents and at the same time may exhibit antistick behavior (e.g., polymeric silicones), they may be very migratory, i.e., they spontaneously spread along surfaces for long distances, thereby contaminating large areas of the coating facilities, as well as the image-forming material and thermal imaging equipment. Further, when donor sheets are stored in roll form, some silicones may migrate from the side of the sheet to which they have been applied to its opposite side, where they may interfere with the thermal imaging process. Crosslinking or high degrees of polymerization of silicone polymers may be helpful in reducing migration, but because even small amounts of uncrosslinked silicones can have a significant negative effect upon imaging, it is difficult to achieve sufficient crosslinking. Waxes may easily be applied to the thermographic sheet, but they generally contaminate printheads to an unacceptable degree. One additional disadvantage of using an antistick layer in a thermographic sheet is that the application of such a layer requires an additional coating step.

Thus, it would be desirable to use a material as a donor sheet substrate which does not stick to the thermal printhead or dimensionally distort upon heating. However, such a material should also perform about as well as PET film in donor sheets. It would also be desirable to use, as an antistick layer, a composition possessing antistick properties which does not have the disadvantages of some of the compositions described in the art.

SUMMARY OF THE INVENTION

In one aspect, this invention provides a thermographic element (e.g., sheet or ribbon) comprising at least two layers, wherein:

at least one of the layers comprises polymer (hereinafter, for brevity, occasionally referred to as FPE polymer), the polymer consisting or consisting essentially of, repeating, interpolymerized units derived from 9,9-bis-(4-hydroxyphenyl)-fluorene and isophthalic acid, terephthalic acid or mixtures thereof, the polymer being sufficiently low in oligomer (i.e., chemical species having molecular weights of about 8000 or less) content to allow formation of uniform film; and at least one of the layers is an imaging layer, that is, a dye-donor layer, an image-receiving layer or a heat-activatable imaging layer. Preferably the FPE polymer has a narrow molecular weight distribution as measured by a polydispersivity between 2 and 4.

In another aspect, this invention provides a thermographic element useful as a donor element, having a substrate layer comprising the FPE polymer, and disposed on one of the major surfaces of the substrate layer, a dye-donor layer, the dye-donor layer being selected from any of those compositions described as useful for dye-donor layers in thermal transfer chemical reaction systems, thermal mass transfer systems and thermal dye transfer systems.

In another aspect, this invention provides a thermographic element useful as a donor element having a substrate layer comprising material selected from the group of materials consisting of paper and filled or transparent films comprising polyester (other than FPE polymer, for example, polyethylene terepthalate), polysulphone, polystyrene, polycarbonate, polyimide, polyamide, cellulose ester, and polyvinyl chloride film, having disposed on one of the major surfaces of the substrate layer, a dye-donor layer, the dye-donor layer being selected from any of those compositions described as useful for dye-donor layers in thermal transfer chemical reaction systems, thermal mass transfer systems and thermal dye transfer systems, and having disposed on the other major surface of the substrate layer, an antistick layer comprising the FPE polymer.

In yet another aspect, this invention provides a thermographic element useful in thermal transfer printing processes as a receptor element, the element comprising a substrate layer comprising the FPE polymer and, having disposed on one of the major surfaces of the substrate layer, an image-receiving layer, the image-receiving layer being selected from any of those compositions described as useful for image-receiving layers in thermal transfer chemical reaction systems and thermal dye transfer systems.

In yet another aspect, this invention provides a thermographic element useful in direct thermal printing processes, the element comprising a substrate layer comprising the FPE polymer, and having disposed on one of the major surfaces of the substrate layer, a heat-activatable imaging layer. The heat-activatable imaging layer may be selected from the group consisting of any of those compositions described as useful for heat-activatable imaging layers in direct thermal imaging processes. In one preferred embodiment of the thermographic element, the element comprises a substrate layer comprising the FPE polymer, having disposed on one of the major surfaces of the substrate layer, a heat-activatable imaging layer, and disposed upon the exposed surface of the heat-activatable imaging layer, an antistick layer comprising the FPE polymer.

When the dye-donor, image-receiving or heat-activatable image layer is prepared from a composition containing one or more compounds which can act as solvents for the FPE substrate (e.g., tetrahydrofuran), the elements described above optionally further comprise a protective layer disposed directly on the surface of the substrate layer between the dye-donor, image-receiving or heat-activatable imaging layer and the substrate layer.

In yet another aspect, this invention provides a method of thermal transfer imaging, the process comprising the step of selectively transferring in an imagewise manner an image-forming material from a dye donor element (sheet or ribbon) to a receptor element, the receptor element consisting of a film or sheet comprising the FPE polymer.

In so far as is known, this invention is the first to use the FPE polymer in thermographic elements and imaging processes such as those described above, and is the first to employ the many useful properties of the FPE polymer (even when formed into very thin films) in thermographic elements. Through this invention thermographic elements have been prepared using the FPE polymer which have advantages over thermographic elements prepared from conventional materials. It has now been found that the FPE polymer can be used to prepare antistick compositions useful for thermographic elements, and that such compositions do not require additional low surface energy compounds such as those described above. It has also been found that an FPE film or sheet that is laminated or simply laid upon the surface of a thermographic element is an effective antistick layer. Such a construction has the further advantage that if the FPE film is only temporarily laminated or laid upon the element it may be removed after imaging and reused. Representative values of some of the useful physical and chemical properties of the FPE polymer are summarized in TABLE-1.

TABLE 1

| COMPARATIVE FILM PROPERTIES | | |
|---|---|---|
| | VALUE | |
| PROPERTY | FPE | PET |
| $T_m$ (°C.) ASTMD-793 | None | 260 |
| $T_g$ (°C.) | 330 | 80 |
| Shrinkage @200° C. (%) | <0.2 | 4.3–8.0 |

TABLE 1-continued

COMPARATIVE FILM PROPERTIES

| PROPERTY | VALUE | |
|---|---|---|
| | FPE | PET |
| Moisture coefficient of expansion (m/m/% R.H.) | $0.8 \times 10^{-5}$ | $1.3 \times 10^{-5}$ |
| Heat of distortion (%) ASTMD-1637 | <<0.1 (21–300° C.) for 50 psi load 1.0 (21–300° C.) for 300 psi load | N/A* |
| Coefficient of friction (%) ASTMD-1894 | | |
| $\mu_s$ (starting) | 0.4–0.6** | 0.4–0.6*** |
| $\mu_k$ (kinetic) | 0.4–0.6** | 0.4–0.6*** |
| Coefficient birefringence[a] | 0.0003 | 0.01–0.1 |
| Haze (%) ASTMD-1003 | 0.1 | 0.4–0.8 |

*Data is not available for PET because the polymer melts at a temperature within the test range.
**Film contained no slip agents.
***Film contained slip agents, without slip agents may have coefficients of friction of 2 or more.
[a]Measured using a Gaetner Babinet compensator.

BRIEF DESCRIPTION OF DRAWINGS

The invention is described in detail hereinafter with reference to the accompanying drawings in which.

DETAILED DESCRIPTION OF THE INVENTION

Figure 1:
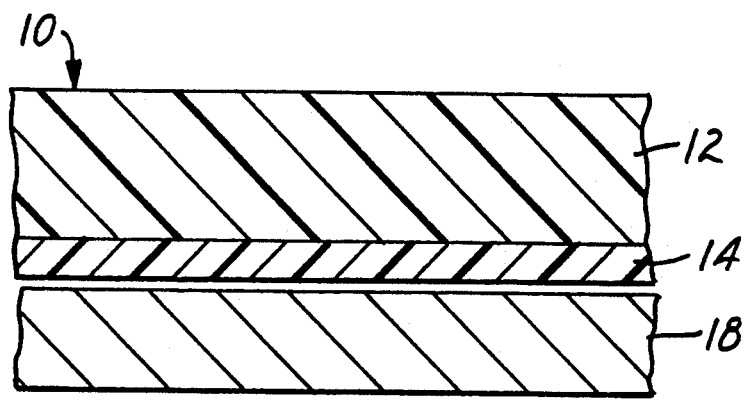
FIG. 1 is a cross-sectional view of one embodiment of a donor element of the present invention.

FIG. 1 depicts a donor element 10 suitable for use in a thermal transfer printing process. Donor element 10 comprises a substrate layer 12, comprising the FPE polymer. Optionally, the substrate layer 12 further comprises a small amount (e.g., 5 weight percent or less) of a slip compound such as silicon dioxide, aluminum silicate, aluminum oxide, calcium carbonate or fuse silica. The substrate layer 12 may, if desired, also further comprise white or colored fillers. Many of such fillers known in the art are useful in this invention. The substrate layer 12 may be used in a sheet size embodiment or in a continuous roll form such as a continuous web or ribbon. A dye-donor layer 14 comprising any of the image-forming compositions described as useful for thermal transfer chemical reaction, dye transfer or mass transfer imaging processes is disposed on one of the major surfaces of the substrate layer 12. Hereinafter, the major surface of the substrate layer 12 carrying the dye-donor layer 14 will be called the front side of the donor element 10. The opposite major surface of the substrate layer 12 will hereinafter be called the back side of donor element 10. Because of the high $T_g$ and excellent surface properties (e.g., low coefficient of friction) of the substrate layer 12, no antistick layer need be applied to the back side of the donor element 10 to prevent sticking of the donor element 10 to a thermal printhead.

Typically, the substrate layer 12 is in the form of a film comprising FPE polymer. The film generally has a thickness of less than about 20 microns, preferably 6 microns or less, and most preferably 4.5 microns or less. Since thinner donor elements generally result in higher thermal transfer imaging process efficiencies, very thin donor films (e.g., 1.5 to 3 microns in thickness) are generally very desirable. In contrast, many of the polymeric films which have been described as useful for thermographic elements are not currently available in thicknesses of less than 6 microns, and those which are available have other disadvantages which render them less desirable for use in donor elements than FPE film. For example, 4.5 micron PET film is generally difficult to handle on thermal transfer imaging equipment because it can tear, dimensionally distort upon application of heat from the printhead, or melt and stick to the printhead in the absence of an antistick layer.

The composition of the dye-donor layer 14 will depend upon the thermal transfer imaging process desired, and many of the compositions known in the art may be used in this invention (e.g., U.S. Pat. Nos. 4,853,365 (Jongewaard et al.), 4,847,238 (Jongewaard et al.), 4,822,643 (Hsin-Hsin et al.) and 4,839,224 (Hsin-Hsin et al.) incorporated herein by reference). Briefly described, the dye-donor layer 14 typically comprises a meltable wax or meltable polymeric material, to which colorants and other additives to improve transferability have been added. Suitable colorants and additives are well known to one of ordinary skill in the art. Alternatively, the dye-donor layer 14 can comprise a sublimable dye or other colorant which is transferable upon application of heat. Alternatively, the dye-donor layer 14 can comprise at least one chemical substance which, upon application of heat, is transferred to a receptor sheet 18 and reacts with other materials contained on the receptor sheet 18 to form a colored compound, which colored compound is then retained on the receptor sheet 18 forming an image. Examples of this mode of image formation include systems in which the leuco form of a dye is incorporated into the receptor sheet 18, and a phenolic compound is incorporated into the dye-donor layer 14. Upon heating, the phenolic compound diffuses into the receptor sheet 18, and converts the leuco form of the dye to its colored form to create an image. Alternatively, the leuco form of the dye can be contained in the dye-donor layer 14, from which it then diffuses, upon heating, into the receptor sheet 18, to react with an activating agent contained therein.

The dye-donor layer 14 can comprise two or more distinct layers, for example, the layer nearest the substrate layer 12 can be a heat-activated release layer, the next layer can contain a colorant, and the outermost layer may be formulated to improve adhesion of the colorant to the receptor.

The dye-donor layer 14 is generally applied to the substrate layer 12 in the form of a solution or dispersion of the components of the dye-donor layer in an organic solvent. If the solution or dispersion applied to the substrate layer 12 contains one or more compounds which act as solvents for the FPE polymer (e.g., tetrahydrofuran (THF), 1,2-dichloroethane (DCE), N-methylpyrrolidone (NMP), cyclohexanone and methylene chloride), a protective layer (not shown) is preferably provided between the dye-donor layer 14 and the substrate layer 12. The protective layer is chemically resistant to the compounds acting as solvents for the FPE polymer and may be provided by any process rendering the surface of the FPE substrate layer 12 chemically resistant to the solvent(s). For example the surface of substrate layer 12 can be coated with a chemically resistant coating or it can be otherwise treated to render it chemically resistant. One chemically resistant coating composition comprises certain branched acrylic monomers which are "graft-polymerized" to the FPE substrate layer using actinic radiation. Some of the branched acrylic monomers can be selected from the group consisting of trimethylolpropanetriacrylate (TMPTA), pentaerythritoltetraacrylate (PET$_4$A), dipentaerythritolhydroxypentaacrylate (DPOPA), N,N-dimethylacrylamide (DMA), and tetraethyleneglycoldiacrylate (T$_4$EGDA). Typically, the chemically resistant coatings are one micron or less in thickness, more preferably, these coatings are 0.5 micron or less in thickness, e.g., 0.3 to 0.5 micron. Alternatively, the protective layer may result from a surface treatment of the substrate layer 12 rendering it more chemically resistant, e.g., by cross-linking or crystallizing molecules located at the surfaces of the substrate layer. For example, controlled exposure of the surface of the FPE substrate layer to actinic radiation, e.g., using an electron-beam, laser or UV lamps can render the surface more chemically resistant. Processes useful to treat the surface of the FPE substrate layer to render it more chemically resistant to solvents are described in U.S. Pat. Nos. 4,879,176 (Ouderkirk et al), 4,822,451 Ouderkirk et al), and 4,902,378 (Ouderkirk et al) incorporated herein by reference.

In another embodiment of a donor element of this invention, instead of FPE polymer, the substrate layer 12 comprises one of the materials described in the art as useful for this purpose. Representative examples of such materials include films of transparent or filled polymers such as polyester other than the FPE polymer, polyethylene napthalate, polysulfone, polycarbonate, polyimide, polyamide, cellulose ester and paper. Since such a substrate layer 12 would not possess the high T$_g$ and low coefficient of friction of an FPE substrate layer, an antistick layer (not shown) comprising FPE polymer is disposed on the back side of the substrate layer 12

The antistick layer may be a film or sheet comprising or consisting essentially of FPE polymer. Optionally, the film or sheet may further comprise a slip compound such as those described above. The film or sheet may be permanently or temporarily laminated together with the remaining portion of the donor element, for example, by using an adhesive, preferably a pressure sensitive adhesive or a compatible polymeric binder, which will remain flexible and provide adhesion even at imaging temperatures. Examples of compatible polymeric binders may include polyvinylacetate, cellulose derivative, cellulose acetate butyrates, polyvinyl butyrates, vinyl polymers and vinyl copolymers. Alternatively, the layers may be held together using a mechanical fixture, or by heating the donor substrate layer to its softening temperature, laminating the FPE film to the substrate layer and cooling the construction.

The antistick layer can also comprise FPE polymer and at least one binder polymer. In this instance, the antistick layer is applied to the surface of the donor substrate layer by cooling a solution or dispersion of the component of the antistick layer in an organic solvent and drying the coating. The binder polymer must not adversely affect the antistick properties of the FPE polymer, must improve the adhesion of the antistick layer to the donor element, and must not scratch, erode, contaminate, or otherwise damage printheads, or harm image quality. Both the FPE polymer and binder polymer must be soluble or dispersible in a common solvent or dispersing agent. Examples of such solvents include, but are not limited to THF, DCE, methylene chloride, cyclohexanone, NMP, and blends of such solvents with other common organic solvents such as methyl ethyl ketone (MEK). Many of the binder polymers described as useful in antistick compositions are also useful in this invention. For example, polymethacrylates, polyvinyl stearates, polyesters, chlorinated polyvinyl chlorides, acrylonitriles, styrenes, styrene-butadiene elastomers, ethylene-propylene elastomers, poly(vinyl alcohol-co-butyrol), poly(vinyl alcohol-co-acetal), polyvinyl acetate, cellulose acetate butyrate, cellulose acetate and ethyl cellulose are useful in this invention.

Generally, the FPE polymer comprises 10 to 100% by weight of the antistick layer. If the antistick layer further comprises one or more binder polymers, then the antistick layer preferably comprises at least 50 weight percent FPE polymer. The amount of binder polymer used in the antistick must be sufficient to result in adhesion of the antistick layer to the substrate layer 12, but typically, the binder polymer will be employed at levels of 90 to 10% by weight of the antistick layer. If the binder polymer has a sufficiently high T$_g$ not to soften or melt at thermal imaging process temperatures, a somewhat larger amount of binder polymer can be used in the antistick layer. For example, in some cases, up to a 2 to 1 weight ratio of FPE polymer to binder polymer can be employed in the antistick layer. Examples of binder polymers which may be employed at these higher levels include polyvinylstearates, acrylonitriles and ethylene-propylene elastomers.

The antistick layer may additionally contain filler materials and other additives, provided such materials do not inhibit the antistick features of the antistick layer, and further provided that such materials do not scratch, erode, contaminate, or otherwise damage printheads, or harm image quality. It is preferred that the concentration of such fillers and other additives be kept below about 5% by weight, though the maximum permissible concentration depends upon the particular filler used. Fillers suitable for the antistick layer of this invention include crystalline polymeric particulate material, crosslinked polymeric particulate material, non-migratory polymeric particulate material having low surface energy, and non-abrasive inorganic materials. Fillers that are particularly suitable in this regard include amorphous fumed silica (e.g., "SYLOID", available from W.R. Grace & Co.) and urea-formaldehyde particles of submicron size agglomerated into particles of about 5 to 6 micron diameter (e.g., "PERGOPAK M2", available from Ciba-Geigy), and submicron-sized aluminum oxide particles. Addition of such particulate materials has the desirable effect of reducing the coefficient of friction of the antistick layer.

Non-particulate additives suitable for the antistick layer of this invention include surfactants, antistatic agents, lubricants, plasticizers, and other modifiers, provided that such additives do not contaminate or damage the printhead and do not have a deleterious effect upon the imaging capabilities of the donor element 10 or receptor sheet 18.

Figure 2:
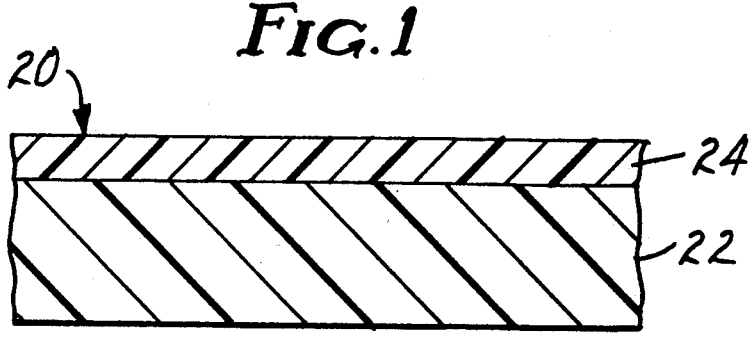
FIG. 2 is a cross-sectional view of one embodiment of a receptor element which may be employed in the present invention.

FIG. 2 depicts one embodiment of a receptor element which may be used in this invention. The receptor element 20 comprises a substrate layer 22, having disposed on one of its major surfaces, image-receiving layer 24.

The substrate layer 22 can comprise FPE polymer, generally in the form of a sheet or film, which optionally may contain a small amount (e.g., 5 weight percent or less) of one of the slip compounds described above and white or colored fillers. The substrate layer 22 may be used in a sheet size embodiment or in a continuous roll form such as a continuous web or ribbon, however, for most applications, a sheet size embodiment is preferred. Typically, the substrate layer 22 has a thickness of 2 to 200 mils (0.05 to 5 mm), however, because of the excellent strength of the FPE polymer film, the substrate layer 22 can be less than 2 mils (0.05 mm) thick, may be less than 6 microns thick, and even less than 3 microns thick. The FPE film provides advantages over materials currently used as receptor element substrate layers because it possesses a low birefringence coefficient, low percent haze, is colorless, relatively unreactive with compounds comprising the dye-receiving layer and nonhygroscopic. Thus, it provides advantages when employed in receptor elements requiring transparent substrates, such as receptor elements used as overhead transparencies after they have been imaged. It also has low reactivity with components of any image-receiving layer and low hygroscopicity resulting in longer receptor element shelf life.

The composition of the image-receiving layer 24 will depend upon the thermal transfer imaging process selected and the chemical composition of the dye-donor layer of the donor element used in conjunction with the receptor element in the thermal transfer imaging process. Many of the compositions known in the art are suitable in this invention (e.g., U.S. Pat. No. 4,853,365 (Jongewaard et al.) incorporated herein by reference). The image-receiving layer 24 of the receptor element 20 can comprise at least one chemical substance which, reacts with other materials transferred upon application of heat from the dye-donor layer of a donor element to form a colored compound, which colored compound is then retained on the receptor element 20 forming an image such as the leuco dye and phenolic-compound system described hereinabove.

When the composition used to prepare the image-receiving layer 24 contains one or more compounds which also act as solvents for the FPE polymer a protective layer (not shown), as described above, preferably is provided between the image-receiving layer 24 and the substrate layer 22. If the substrate layer is selected from the group consisting of materials described in the art as useful for this purpose (c.g., paper and filled or transparent film of polyester (other than FPE polymer) polyethylene naphthalate, polysulfone, polycarbonate, polyimide, polyamides and cellulose ester), then the image-receiving layer 24 comprises in addition to the other ingredient commonly used in compositions for thermal dye transfer, thermal chemical reaction and thermal transfer systems up to about 50 weight percent FPE polymer. The FPE polymer then provides improved slip or antistick properties to the image-receiving layer and may improve the adhesion of the dye or pigment to the receptor element.

Figure 3:
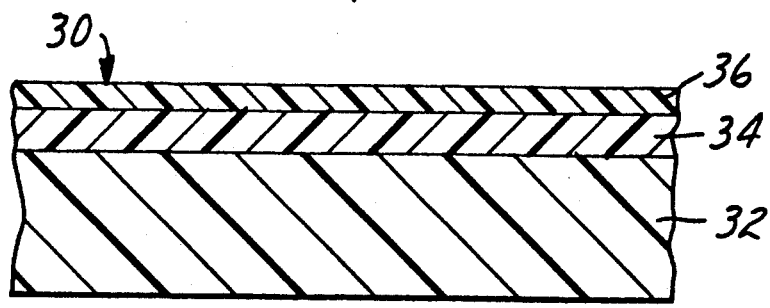
FIG. 3 is a cross-sectional view of one embodiment of a thermographic element of the present invention used for direct thermal printing.

FIG. 3 depicts one embodiment of a thermographic element of this invention which is useful in direct thermal imaging processes. This thermographic element 30 comprises a substrate layer 32, having disposed on one major surface a heat-activatable image-forming layer 34. Optionally, an antistick layer 36 may be disposed on the exposed surface of the image-forming layer 34. Substrate layer 32 can be selected from materials from the group consisting of paper and, transparent or filled, films of polyester (other than FPE polymer), polyethylene napthalate, polysulfone, polycarbonate, polyimide, polyamide and cellulose ester, but preferably, substrate layer 32 comprises FPE polymer. Optionally, the substrate layer 32 may further comprise a small amount (e.g., 5 weight percent or less) of one of the slip compounds described above, or, if desired, white or colored fillers. The substrate layer 32 may be used in a sheet size embodiment or in a continuous roll form such as a continuous web or ribbon, however, for most applications, a sheet size embodiment is preferred. Generally, the thickness of the substrate layer 32 will vary depending upon how the thermographic element 30 will be used after imaging. Typically, the substrate layer 32 comprises FPE film having a thickness of 2 to 200 mils (0.05 to 5 mm), however, because of the strength of FPE film, the substrate layer 32 can be less than 2 mils (0.05 mm) thick, may be less than 6 microns thick, and even less than 3 microns thick. The FPE film has advantages over materials currently used in thermographic elements used in direct thermal printing because it possesses a low birefringence coefficient, low percent haze and it is colorless. Thus, it provides advantages over conventional substrate materials when employed in applications requiring transparent substrates, e.g., overhead transparencies. The FPE film is also relatively unreactive with compounds comprising the heat-activatable imaging layer and is nonhygroscopic. Thus, it also provides advantages over conventional substrate materials even in applications that do not require transparent substrates because the low reactivity and low hygroscopicity of the FPE film can result in longer element shelf life.

Heat-activatable imaging layer 34 may comprise any thermally sensitive image-forming composition useful in direct thermal imaging processes. Many compositions described as useful for this purpose can be used in this invention (e.g., U.S. Pat. Nos. 4,910,186 (Whitcomb) and 4,808,565 (Whitcomb et al) incorporated herein by reference). Some useful compositions comprise a polymeric binder, a leuco dye and a heat activatable color developing agent, such as, for example, an acid-sensitive leuco dye and a thermally releasable acid.

The antistick layer 36 may comprise any of the antistick compositions described as useful in direct thermal transfer or thermal transfer imaging processes (e.g., Japanese Kokai No. 7467/1980 and KoKoKu No. 49638/1989, U.S. Pat. Nos. 4,592,945 and 4,572,860 U.S. patent application Ser. No. 326,300 and Japanese Patent Applications Nos. 60-220794A2, 60-230876A2). However, preferably the antistick layer 36 comprises FPE polymer as described above. However, if an FPE film is used as an antistick layer, any adhesive or compatible polymeric binder used to laminate the FPE film to the heat-activatable imaging layer must permit the FPE film to adhere to the dye layer either permanently or temporarily as desired and must not react with the dye layer. Heat could also be used to laminate the FPE film to the dye layer, for example by heating the thermographic element until one or more of the binder polymers in the dye layer softens, laminating the film together with the element and cooling the element.

The dye-donor, image-receiving, heat-activatable imaging, protective, and antistick layers described above can be applied to the thermographic elements by means known to one of ordinary skill in the art. A particularly useful method of applying such layers involves the steps of dissolving or dispersing the components of the particular layer in a suitable organic solvent, or if appropriate, in water, and applying the resulting solution or dispersion to the element by means of a conventional solution coating apparatus, such as a wire-wound rod (Mayer rod), knife coater, extrusion coater, rotogravure coater, dip coater, electro-spray coater, kiss coater or other conventional coater, followed by drying the applied coating with heated air in a controlled manner to minimize curling of the thermographic element. The thickness of the resulting coating can be controlled by controlling the viscosity of the solution or dispersion, and by controlling the amount of the solution or dispersion applied to the element. Typically, antistick coatings are less than 2 microns thick after drying, and preferably are less than one micron thick. Dye-donor, dye-receiving and heat-activatable dye layers are generally less than 1 mil (0.025 mm) in thickness after drying. As stated above, the protective layer is generally 1 micron or less in thickness.

The FPE polymer useful in this invention is described and can be prepared using the method described U.S. Pat. No. 5,115,372, incorporated herein by reference. FPE polymer used to prepare the thermographic elements and the antistick layers described above generally have a weight-average molecular weight of at least 500,000 and preferably about 700,000 or 900,000 or higher.

Preferably the FPE polymer used in this invention has a narrow molecular weight distribution, is measured by polydispersivities of 2 to 4. The polymer is preferably prepared from 9,9-bis(4-hydroxyphenyl)fluorene and a mixture of the isophthalic or terephthalic acid chlorides. The isophthalic and terephthalic acid chloride are preferably employed in a ratio of 70 to 30 parts by weight of terephthalyl chloride to 30 to 70 parts by weight of isophthalyl chloride. Most preferably, an equimolar mixture of terephthalyl chloride and isophthalyl chloride is employed in this invention.

Briefly, the FPE copolymer can be prepared by preparing a mixture of 9,9-bis-(4-hydroxy-phenyl)-fluorene (at least 99.8% pure), an alkaline metal hydroxide such as sodium hydroxide, distilled water, and an organic cosolvent such as dioxane or acetone. A 2.3 to 1 molar ratio of sodium hydroxide to 9,9-bis-(4-hydroxyphenyl)-fluorene is generally employed. The organic cosolvent need not be anhydrous, however if dioxane is used, preferably it should be stripped of peroxide compounds (e.g., passing it through a molecular sieve). The resulting mixture is heated to its boiling point (or preferably simply stirred), cooled to room temperature, and charged into an appropriate reaction vessel equipped with a high speed stirrer and thermometer. Preferably the reaction vessel is equipped with a cooling jacket. With stirring, a room temperature solution of a phase transfer catalyst, preferably benzyl triethyl ammonium chloride, dissolved in distilled water is added, followed by a chilled, organic solvent such as 1,2-dichloroethane or methlene chloride. It is advantageous to chill the organic solvent. To the stirred mixture, another mixture containing an equimolar amount of isophthalyl chloride and terephthalyl chloride in an anhydrous, organic solvent such as 1,2-dichloroethane is added. Stirring is continued while the reaction proceeds. When the reaction has reached the desired degree of completion, the pH of the reaction mixture may be adjusted such that it is acidic, preferably to a pH of about 3 to 4. Alternatively, the reaction mixture may be allowed to separate into an aqueous phase and an organic phase, the aqueous phase is decanted and the pH of the organic phase adjusted as described above. The organic phase contains the FPE polymer. If necessary, additional 1,2-dichloroethane may be added to the organic phase to reduce the solution viscosity to allow stirring. The resulting organic phase is then mixed with approximately an equal volume of deionized water to extract water soluble impurities, such as ionic impurities, from the organic phase. The water and dissolved impurities are allowed to separate from the organic phase and are decanted. This procedure is repeated until the conductivity of the decanted water is 20 $\mu$mho or less. After the final washing step, the FPE polymer is precipitated from the organic phase by stirring into the organic phase an excess (approximately two times the organic phase volume) of an organic solvent with selective solubility, that is, an organic solvent in which the oligomeric species are soluble but the polymer is not soluble. The preferred organic solvents for precipitation are the lower ketones containing 3 to 10 carbon atoms, more preferred are those containing 3 to 5 carbon atoms such as methyl ethyl ketone. The most preferred organic solvent for precipitation is acetone. Optionally, the precipitated polymer may be washed with distilled water.

Substrate layers 12, 22 and 32 comprising FPE polymer are prepared by casting FPE polymer dissolved in a suitable organic solvent onto a suitable casting substrate (e.g., a stainless steel belt) using any of the solution coating methods described above, evaporating the solvent and removing the resulting film from the casting substrate. The thickness of the resulting film can be controlled by controlling the viscosity of the FPE polymer solution and the amount of the solution applied to the casting substrate. Optionally, a small amount (i.e., less than about 5 weight percent of the casting solution and preferably less than about 2.5 weight percent of the casting solution) of a slip compound, such as those described above, may be added to the casting solution. Suitable organic solvents for the preparation of FPE polymer films include, but are not limited to, cyclohexanone, methylene chloride, and 1,2-dichloroethane. NMP is not a preferred solvent because FPE films cast from solutions made using NMP are somewhat hazy.

As stated above, the unique properties of the FPE films permit the use of thinner films in donor, receptor and direct thermal imaging elements than could have been achieved using conventional materials. FPE films as thin as 3.0 microns can be transported through direct thermal and thermal transfer printers without tearing, curling, sticking or jamming.

The following non-limiting examples are provided to further illustrate the invention.

EXAMPLES

In the following Examples, thermographic elements are evaluated using an apparatus, such as that depicted in FIG. 4, which approximates the conditions encountered in commercially available thermal transfer printing machines. The apparatus consists of the following elements 1. Thermal printhead 40, having heated printing elements 42, of a type used in commercially available thermal printing machines.

2. Electronic circuitry 44, capable of driving thermal printhead 40 in the manner prescribed by the printhead manufacturer, with the additional capability of varying the voltage driving the printing elements 42 of thermal printhead 40. The circuitry also includes means provided for measuring the voltage provided to printhead 40.

3. Mechanical fixture 46 and heat sink 48 for holding thermal printhead 40 in such a position that printing elements 42 remain in contact with donor 50 and receptor 52 during the printing process.

4. Drive roll 54 for advancing the image-forming materials past the printhead as printing takes place.

Figure 4:
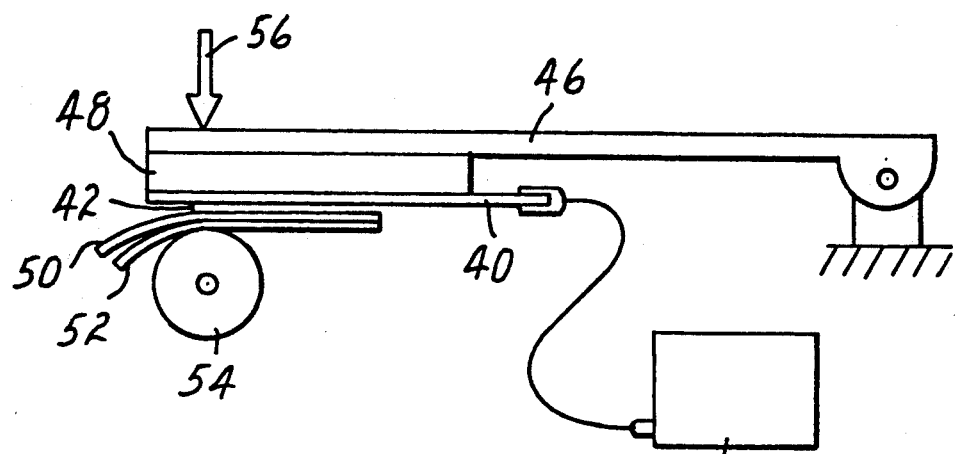
FIG. 4 illustrates one method by which a receptor element can be imaged and by which the materials of the present invention can be tested.

The printhead 40 is held against rubber drive roll 54 having a Shore hardness of 40 to 50, as shown in FIG. 4. Imaging pressure is determined by the force applied in holding printhead 40 against rubber drive roll 54, represented by weight 56. Donor 50 and receptor 52 were sandwiched together and driven past printhead 40 by rotation of drive roll 54. Electronic circuitry 44 supplying the imaging signal to the printhead 40 provides a square wave pulse signal known as the burn profile of the imaging signal. The height of the square wave pulses, hereinafter called the pulse voltage, is adjustable to values both above and below a nominal value.

Fixture 46 for holding the printhead during use, and the apparatus for transporting donor 50 past printing elements 42 are constructed in accordance with the specifications provided by the printhead manufacturers to closely approximate the conditions encountered in commercial applications of the printhead.

The following Examples employ a Kyocera model KMT-128-8MPD4-CP raised glaze thin film thermal printhead, having 8 dots/mm and 0.3 watts/dot. The imaging pressure of the thermal printhead is 2.0 Kg distributed over the 128 mm printhead width unless stated otherwise.

Examples 1 to 4 and Comparative Example 1C

These Examples illustrate the effectiveness of antistick layers comprising FPE polymer.

Mixtures are prepared of the formulations described in TABLE-2. The mixtures are then coated onto one side of 6 micron Teijin Type F24G PET film (available from Teijin) to a wet coated thickness of about 0.72 mil (18 microns) using a number 8 Mayer bar. The coated films are then dried by means of forced heated air.

The films, now coated on one side, are each transported through the test apparatus with a receptor sheet of thermal dye transfer paper commercially available from DaiNippon Printing Company. The printhead is operated for each antistick coating at a series of predetermined head voltages and a 23 millisecond pulse rate. The printhead is initially run at low voltages, and then at successively increasing voltages, while applying print signals to all the segments of the printhead at the rate used to print solid coverage of the receptor. These conditions are used because sticking is most severe when the printhead is printing a solid bar running the full width of the printhead and every element of the printhead is activated at every position on the sheet to be imaged. In these examples, the head voltage is varied from 9 to 20 volts. This approximately corresponds to energies of 4.0 to 18.6 Joules/cm$^2$.

Performance of the antistick coatings is evaluated by noting (a) smoothness of transport through the test apparatus, including degree of tearing or ripping, (b) noise level during transport, and (c) contamination of the printhead. High noise levels are taken to be an indication of partial sticking, which indicates that the level of performance is unacceptable. In order to be judged acceptable, the donor and receptor sheets must transport through the test apparatus without noise at least up to a 16 V (13.21 Joules/cm$^2$) head voltage level.

The antistick layers made using the compositions of Examples 1 to 4 transport smoothly through the test apparatus, producing minimal or no noise at head voltages of 16 V or more, without causing stoppage, jamming, tearing, or ripping of the film in the apparatus, and with minimal or no contamination of the printhead at all of the energy levels applied by the printhead indicating that all of the compositions comprising FPE polymer and a binder polymer perform effectively as antistick compositions.

The film coated with the antistick composition 1C (described in TABLE-2) flakes off when passed through the test apparatus indicating poor adhesion of the antistick layer to the PET film.

The test compositions and the maximum head voltages producing minimal or no noise are summarized in TABLE-2.

TABLE 2

ANTISTICK COATING COMPOSITIONS

| EXAMPLE | COMPOUND[d] | AMOUNT (g) | VOLT (V) |
|---|---|---|---|
| 1C | FPE polymer | 5 | |
| | Tetrahydrofuran | 100 | —[c] |
| 1 | FPE polymer | 4.0 | |
| | Vitel ™ PE 200[a] | 1.0 | 18 |
| | Tetrahydrofuran | 195 | |
| 2 | FPE polymer | 4.0 | |
| | Polysar ™ 346[b] | 0.6 | |
| | Toluene | 19.4 | 20 |
| | Tetrahydrofuran | 76.0 | |
| 3 | FPE polymer | 4.0 | |
| | Vitel ™ PE 200[a] | 0.5 | |
| | Polysar ™ 346[b] | 0.9 | 20 |
| | Toluene | 29.1 | |
| | Tetrahydrofuran | 135.5 | |
| 4 | FPE polymer | 4.0 | |
| | Vitel ™ PE 200[a] | 1.0 | |
| | Polysar ™ 346[b] | 0.9 | 18 |
| | Toluene | 29.1 | |
| | Tetrahydrofuran | 195.0 | |

[a]Vitel ™ PE 200 is a polyester resin available from Goodyear Chemical Corporation.
[b]Polysar ™ is a random copolymer of ethylene and propylene, and is available from Polysar International.
[c]Voltage was not measured due to poor adhesion.
[d]FPE polymer having a polydispersity of 2.2 is used in Examples 1 to 4 and C1.

Examples 5-6

The following Examples illustrate the antistick effectiveness of FPE film with slip agents. Two casting solutions containing FPE polymer and silicon dioxide are prepared. Both casting solutions are prepared using FPE polymer having a polydispersivity of 2.9. Film A is cast using a solution containing 3.5 weight percent FPE polymer, 2.5 weight percent silicon dioxide and the remainder, methylene chloride. Film B is cast using a solution containing 3.5 weight percent FPE polymer, 5 weight percent silicon dioxide and methylene chloride. The casting solutions are hand cast using a knife coater and dried using hot forced air. The dried thickness of film A and film B is nominally 8 microns.

Films A and B are each transported through the test apparatus with a receptor sheet of thermal dye transfer paper used as a support and aid in feeding the thin film through the test apparatus. The thermal transfer paper is commercially available from DaiNippon Printing Company. The printhead is operated in accordance with the procedure described in Examples 1 to 4 except that 5 Kg imaging pressure is used. The DaiNippon paper is generally imaged at 16 V (13.21 Joules/cm²).

Both FPE films transport smoothly through the test apparatus, producing minimal or no noise at head voltages of 16 V or more (in fact film A only starts to produce a minor amount of noise at 20 V and film B produces no noise at 20 V), without causing stoppage, jamming, tearing, or ripping of the film in the apparatus, and with minimal or no contamination of the printhead at all of the energy levels applied by the printhead. These results indicate that the FPE films have antistick properties and perform effectively as donor element substrate layers without requiring an antistick layer.

Example 7

A 10 microns thick film is prepared by casting a 4.5 weight percent solution of FPE polymer (having a weight average molecular weight of 727,000 and a polydispersivity of 2.2) in methylene chloride and drying the casting. The film is then coated with a coating consisting of 25 weight percent trimethylolpropanetriacrylate dissolved in acetone by wiping a thin coating of the solution on both sides of the film. After air drying, each side of the film is passed under 2 UV lamps under a nitrogen atmosphere at a rate of 50 ft/min. The wattage of the UV lamps is 200 watts/in.

Donor elements are prepared from the coated film by applying a composition comprising the components of a dye-donor layer which are dissolved or dispersed in organic solvent. The composition used to prepare the dye-donor layer is summarized in Table II. The composition is applied to one side of each element using a number 8 Mayer bar. The wet thickness of each of the coatings is $1.8 \times 10^{-3}$ cm (0.72 mil). The coated elements are then dried using forced hot air.

One of the donor element is placed in contact with a commercially available base receptor sheet from DaiNippon. The thermal printhead described above is operated in accordance with the procedure described in Examples 1 to 4. The other donor element is placed in contact with a receptor sheet, the receptor sheet being prepared by coating a $1.8 \times 10^{-3}$ cm (0.72 mil) coating of the image-receiving composition (summarized in Table III) onto one surface of a 0.01 cm (4 mil) thick PET film using a number 8 Mayer bar and forced air drying the resulting coating.

Each of the donor elements are passed through the thermal transfer printing apparatus. Both donor elements transport smoothly through the test apparatus, producing minimal or no noise at head voltages of at least 21 volts, causing no stoppage, jamming, tearing, or ripping of the film in the apparatus, and with minimal or no contamination of the printhead at all of the energy levels applied by the printhead. However, the image transfer density of each of the formed images was low. This probably due to the thickness of the FPE film. These results indicate that the FPE films are useful as donor element substrates in thermal transfer imaging processes.

TABLE II

| DYE-DONOR LAYER | |
|---|---|
| Ingredients | Amount (g) |
| Anthraquinone dye[a] | 6.0 |
| Azo dye[b] | 0.9 |
| Temprite TM 663 × 612[c] | 2.5 |

TABLE II-continued

| DYE-DONOR LAYER | |
|---|---|
| Ingredients | Amount (g) |
| 60/40 blend of octadecyl acrylate and acrylic acid | 1.0 |
| Methyl ethyl ketone | 208 |
| Tetrahydrofuran | 47.5 |

[a]Having the general structure

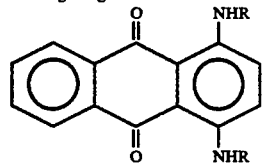

where R is C(CH₃)H(CH₂)₄CH₃
[b]Having the general structure

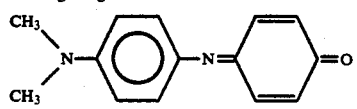

[c]Chlorinated polyvinylchloride, chlorine content 70 weight percent, commercially available from B. F. Goodrich.

TABLE III

| DYE-RECEIVING LAYER | |
|---|---|
| Ingredients | Amount (g) |
| Atlac TM 382ES[a] | 24.8 |
| Temprite TM 674 × 571[b] | 20.0 |
| Atlac TM 386[a] | 5 |
| Piccolastic E125[c] | 2 |
| Polyethylene glycol[d] | 2 |
| Uvinol N539[e] | 5 |
| Fluorad TM FC740[f] | 0.36 |
| Methyl ethyl ketone | 323 |
| Tetrahydrofuran | 380 |

[a]Bisphenol A fumaric acid polyesters available commercially from Reichold Chemical, Inc.
[b]Chlorinated polyvinyl chloride, chlorine content 67.3 weight percent, available commercially from B. F. Goodrich.
[c]Low molecular weight polystyrene commercially available from Hercules Chemical Company.
[d]Molecular weight 1000 commercially available from Aldrich Chemical Company.
[e]UV stabilizer commercially available from BASF.
[f]Fluorocarbon surfactant commercially available from 3M.

Example 8

This example illustrates the use of the FPE film as the substrate layer of a donor element.

The 10 micron FPE film as described in Example 7 is placed against a DaiNippon commercially available white thermal transfer receptor and run on a thermal printer using the Kyocera printhead described above. The printhead is operated as described in Examples 1 to 4 except that the imaging pressure is 5 Kg, and the head voltage is varied from 10 to 18 volts. This approximately corresponds to energies of 5.16 to 16.72 Joules/cm². Many commercially available donor sheets are imaged at 10 volts or more (5.16 Joules/cm²) depending upon the thermal transfer process used.

The film and thermal paper transport smoothly through the test apparatus, producing minimal or no noise at any of the head voltages up to 18 V without causing stoppage, jamming, tearing, or ripping of the film in the apparatus, and with minimal or no contamination of the printhead. These results indicate that the FPE film will perform effectively as the substrate layer of a donor element.

Example 9

This example illustrates the use of FPE film as a receptor element.

A casting solution containing 5 weight percent of FPE polymer (having a polydispersivity of 2.3 and a weight average molecular weight of 720,000) dissolved in methylene chloride is prepared. The casting solution is hand cast using a knife coater and dried using hot forced air. The dried thickness of the resulting film is nominally 50 microns.

The 50 micron FPE film is placed against a commercially available Fuji KK three color thermal ink sheet and run on a thermal printer using the Kyocera printhead described above. The printhead is operated at an imaging pressure of 5 Kg and a head voltage of 10 volts (5.16 Joules/cm$^2$.). Commercially available Fuji KK films are generally imaged at 5.16 Joules/cm$^2$.

After imaging, the Fuji KK sheet is separated from the FPE film and the image is evaluated. The pigment and binder from the Fuji KK sheet is cleanly transferred to the FPE film and the image is sharp, clear, transparent and adheres to the FPE film.

This result indicates that the FPE film functions effectively as a receptor element.

Example 10

This example illustrates the use of an FPE film as an antistick layer. A ten micron thick FPE film similar to that described in Example 8 is laid on the surface of a sheet of Hewlett Packard thermal paper (part No. 9270–0605) which carries the heat-activatable dye layer. The construction is then imaged using the test apparatus described above at the conditions described in Example 9. The FPE film is removed from the thermal paper after imaging. The resulting image is black as expected with only a slight density loss which is probably due to FPE film thickness. The construction did not stick, tear, rip, jam or adhere to and contaminate the thermal printhead. After imaging the FPE film is removed and since it is not dimensionally distorted it can be reused.

This use of an FPE antistick layer is particularly useful in applications in which application of a solution or dispersion of the components of the antistick layer would adversely affect the chemistry of the heat-activatable dye layer.

Various modifications and alterations of this invention will become apparent to those skilled in the art without departing from the scope and spirit of this invention, and it should be understood that this invention is not limited to the illustrative embodiments set forth herein.

We claim:

1. A thermographic element comprising at least two layers, wherein:
    at least one of the layers comprises polymer, and the polymer consists essentially of repeating interpolymerized units derived from 9,9-bis-(4-hydroxyphenyl)-fluorene and isophthalic acid, terephthalic acid or mixtures thereof, and is sufficiently low in oligomer content to allow formation of one uniform film; and
    at least one of the layers is an imaging layer selected from the group consisting of dye-donor layers, image-receiving layers or heat-activatable imaging layers; and
    wherein said polymer-comprising layer further comprises less than about 5 weight percent of a slip compound.

2. An element according to claim 1, wherein the polymer has a polydispersivity of 2 to 4.

3. An element according to claim 1, wherein the slip compound is selected from the group consisting of silicon dioxide, aluminum oxide, aluminum silicate, calcium carbonate and fused silica.

4. An element according to claim 1, wherein the polymer consists essentially of repeating interpolymerized, units derived from 9,9-bis-(4-hydroxyphenyl)-fluorene and a mixture of isophthalic acid and terephthalic acid where the mixtures range in composition from 70 to 30 weight percent isophthalic acid and 30 to 70 weight percent terephthalic acid.

5. An element according to claim 1, wherein the polymer consists essentially of repeating, interpolymerized units derived from 9,9-bis-(4-hydroxyphenyl)-fluorene and an equimolar mixture of isophthalic acid and terephthalic acid.

6. A thermographic element comprising at least a substrate layer and a dye-donor layer, wherein:
    the substrate layer comprises polymer and the polymer consists essentially of repeating interpolymerized units derived from 9,9-bis-(4-hydroxyphenyl)-fluorene and isophthalic acid, terephthalic acid or mixtures thereof and is sufficiently low in oligomer content to allow formation of a uniform film; and
    disposed on one of the major surfaces of the substrate layer is the dye-donor layer.

7. An element according to claim 6, further comprising a protective layer disposed directly on the surface of the substrate layer between the substrate layer and the dye-donor layer.

8. An element according to claim 6, wherein the polymer has a polydispersivity of 2 to 4.

9. A thermographic element comprising at least a substrate layer, a dye-donor layer and an antistick layer, wherein:
    the substrate layer comprises a material selected from the group consisting of paper, filled or transparent films of polyesters other than polyester consisting essentially of repeating interpolymerized units derived from 9,9-bis-(4-hydroxyphenyl)-fluorene and isophthalic acid, terephthalic acid or mixtures thereof, polysulphone, polystyrene, polycarbonate, polyimide, polyamide, cellulose ester and polyvinyl chloride; and
    disposed on a major surface of the substrate layer is a dye-donor layer; and
    disposed on the other major surface of the substrate layer is an antistick layer comprising polymer, the polymer consisting essentially of repeating interpolymerized units derived from 9,9-bis-(4-hydroxyphenyl)-fluorene and isophthalic acid, therephthalic acid or mixtures thereof and being sufficiently low in oligomer content to allow formation of a uniform film.

10. An element according to claim 9, wherein the antistick layer further comprises binder polymer.

11. An element according to claim 10, wherein the binder polymer is selected from the group consisting of polymethacrylates, polyvinyl stearates, polyesters, chlorinated polyvinyl chlorides, acrylonitriles, styrene, styrene-butadiene elastomers, ethylene-propylene elastomers, poly(vinyl alcohol-co-butyrol), poly(vinyl alcohol-co-acetal), polyvinyl acetate, cellulose acetate butyrate, cellulose acetate and ethyl cellulose.

12. An element according to claim 9 wherein the polymer has a polydispersivity of 2 to 4.

13. A thermographic element comprising at least a substrate layer and an image-receiving layer, wherein:
the substrate layer comprises a polymer and the polymer consists essentially of repeating interpolymerized units derived from 9,9-bis-(4-hydroxyphenyl)-fluorene and isophthalic acid, terephthalic acid or mixtures thereof and is sufficiently low in oligomer content to allow formation of uniform film; and
disposed on one of the other major surfaces of the substrate layer is the image-receiving layer.

14. An element according to claim 13, further comprising a protective layer disposed directly on the surface of the substrate layer between the substrate layer and the image-receiving layer.

15. An element according to claim 13 wherein the polymer has a polydispersivity of 2 to 4.

16. A thermographic element comprising at least a substrate layer and an image-receiving layer wherein:
the substrate layer comprises a material selected from the group consisting of paper, filled or transparent films of polyester other than polyester consisting essentially of repeating interpolymerized units derived from 9,9-bis-(4-hydroxyphenyl)-fluorene and isophthalic acid, terephthalic acid or mixtures thereof, polysulphone, polystyrene, polycarbonate, polyimide, polyamide, cellulose ester and polyvinyl chloride; and
disposed on one of the major surfaces of the substrate layer, is the image-receiving layer, which layer comprises polymer and the polymer consisting essentially of repeating interpolymerized units derived from 9,9-bis-(4-hydroxyphenyl)-fluorene and isophthalic acid, therephthalic acid or mixtures thereof and being sufficiently low in oligomer content to allow formation of a uniform film.

17. An element according to claim 16 wherein the polymer has a polydispersivity of 2 to 4.

18. A thermographic element comprising at least a substrate layer and a heat-activatable imaging layer, wherein:
the substrate layer comprises polymer and the polymer consists essentially of repeating interpolymerized units derived from 9,9-bis-(4-hydroxyphenyl)-fluorene and isophthalic acid, terephthalic acid or mixtures thereof and is sufficiently low in oligomer content to allow formation of a uniform film; and,
disposed on one of the major surfaces of the substrate layer is the heat-activatable imaging layer.

19. An element according to claim 18, further comprising an antistick layer disposed on an exposed surface of the heat-activatable imaging layer.

20. An element according to claim 19, wherein the antistick layer comprises the polymer.

21. An element according to claim 20, wherein the antistick layer further comprises binder polymer.

22. An element according to claim 21, wherein the binder polymer is selected from the group consisting of polymethacrylates, polyvinyl stearates, polyesters, chlorinated polyvinyl chlorides, acrylonitriles, styrene, styrene-butadiene elastomers, ethylene-propylene elastomers, poly(vinyl alcohol-co-butyrol), poly(vinyl alcohol-co-acetal), polyvinyl acetate butyrate, cellulose acetate and ethyl cellulose.

23. An element according to claim 18, further comprising a protective layer disposed directly on the surface of the substrate layer between the substrate layer and the heat-activatable imaging layer.

24. An element according to claim 18 wherein the polymer has a polydispersivity of 2 to 4.

25. A thermographic element comprising at least a substrate layer, a heat-activatable imaging layer and antistick layer wherein:
the substrate layer comprises a material selected from the group consisting of paper, filled or transparent films of polyesters other than polyester consisting essentially of repeating interpolymerized units derived from 9,9-bis-(4-hydroxyphenyl)-fluorene and isophthalic acid, terephthalic acid or mixtures thereof, polysulphone, polystyrene, polycarbonate, polyimide, polyamide, cellulose ester and polyvinyl chloride; and
disposed on one of the major surfaces of the substrate layer is the heat-activatable imaging layer; and
disposed on an exposed surface of the heat-activatable imaging layer is the antistick layer comprising polymer, the polymer consisting essentially of repeating interpolymerized units derived from 9,9-bis-(4-hydroxyphenyl)-fluorene and isophthalic acid, therephthalic acid or mixtures thereof and being sufficiently low in oligomer content to allow formation of a uniform film.

26. An element according to claim 25 wherein the polymer has a polydispersivity of 2 to 4.

27. A method of thermal transfer imaging, the process comprising the step of selectively transferring in an imagewise manner, an image-forming material from a dye donor element to a receptor element, the receptor element comprising polymer consisting essentially of repeating, interpolymerized units derived from 9,9-bis-(4-hydroxyphenyl)-fluorene and isophthalic acid, terephthalic acid and mixtures thereof.

* * * * *

UNITED STATES PATENT AND TRADEMARK OFFICE
CERTIFICATE OF CORRECTION

PATENT NO. : 5,318,938
DATED : June 7, 1994
INVENTOR(S) : Hampl, Jr. et al.

It is certified that error appears in the above-indentified patent and that said Letters Patent is hereby corrected as shown below:

Col. 2, line 35, "095-A," should be --093-A,--

Col. 5, line 48, "fuse" should be --fused--.

Col. 15, line 58, "This probably"
    should be --This is probably--.

Col. 17, line 17, "(5.16 Joules/cm$^2$.)."
    should be --(5.16 Joules/cm$^2$).--.
Col. 18:
Claim 9, lines 57-58, and col. 19, claim 16, line 38, "therephthalic"
    should be --terephthalic--.
Col. 20:
Claim 25, line 24, "antistick" should be --an antistick--.

Claim 22, line 13, "alcohol-co-butyrol
    should be --alcohol-co-butyral--.

UNITED STATES PATENT AND TRADEMARK OFFICE
CERTIFICATE OF CORRECTION

PATENT NO. : 5,318,938
DATED : June 7, 1994
INVENTOR(S) : Hampl, Jr. et al.

It is certified that error appears in the above-indentified patent and that said Letters Patent is hereby corrected as shown below:

Col. 17:
Claim 1, line 63, "of one" should be --of--.
Col. 19:
Claim 16, line 35, "consisting" should be --consists--.

Cover page, item [75], "Edward F. Hampl, Jr.; Susan K. Jongewaard, both of St. Paul;" should read --Edward F. Hampl, Jr., St. Paul; Susan K. Jongewaard, North St. Paul;--.

Signed and Sealed this

Thirtieth Day of May, 1995

Attest:

BRUCE LEHMAN

*Attesting Officer*          *Commissioner of Patents and Trademarks*